(12) United States Patent
Chen et al.

(10) Patent No.: US 7,349,310 B2
(45) Date of Patent: Mar. 25, 2008

(54) OPTICAL DISK DRIVE FOR WRITING A RE-WRITABLE OPTICAL DISK AND METHOD THEREOF

(75) Inventors: Shih-Fang Chen, Taipei (TW); Chin-Yin Tsai, Taipei (TW)

(73) Assignee: Tian Holdings LLC, Wilmington, DE (US)

( * ) Notice: Subject to any disclaimer, the term of this patent is extended or adjusted under 35 U.S.C. 154(b) by 551 days.

(21) Appl. No.: 10/990,805

(22) Filed: Nov. 17, 2004

(65) Prior Publication Data
US 2005/0105431 A1 May 19, 2005

Related U.S. Application Data

(60) Provisional application No. 60/520,711, filed on Nov. 17, 2003.

(51) Int. Cl.
*G11B 5/09* (2006.01)
*G11B 7/00* (2006.01)

(52) U.S. Cl. ............... 369/53.15; 369/53.33; 369/124.12

(58) Field of Classification Search ............... None
See application file for complete search history.

(56) References Cited

U.S. PATENT DOCUMENTS

| | | | |
|---|---|---|---|
| 4,512,004 A | 4/1985 | Nonaka | |
| 4,878,211 A | 10/1989 | Suzuki et al. | |
| 5,029,155 A | 7/1991 | Kenjo | |
| 5,216,659 A | 6/1993 | Call et al. | |
| 5,245,598 A | 9/1993 | Burroughs | |
| 5,367,513 A | 11/1994 | Bates et al. | |
| 5,710,748 A | 1/1998 | Hofer | |
| 6,745,167 B2 * | 6/2004 | Sun | 706/8 |
| 6,882,611 B2 * | 4/2005 | Chen | 369/53.15 |
| 7,035,176 B2 * | 4/2006 | Tsai | 369/44.29 |
| 7,092,324 B2 * | 8/2006 | Koh | 369/44.29 |
| 7,120,100 B2 * | 10/2006 | Hung et al. | 369/53.15 |
| 7,149,169 B2 * | 12/2006 | Juan et al. | 369/53.22 |

FOREIGN PATENT DOCUMENTS

| | | |
|---|---|---|
| CN | 1407552 | 4/2003 |
| JP | 63117336 | 5/1988 |

\* cited by examiner

*Primary Examiner*—William Korzuch
*Assistant Examiner*—Peter Vincent Agustin
(74) *Attorney, Agent, or Firm*—Perkins Coie LLP

(57) ABSTRACT

An optical disk drive of recording a re-writable optical disk and the method thereof. First, an optimum power is determined. A gain of a SBAD (Sub Beam Adder) signal is adjusted for generating an calibrated SBAD signal such that the calibrated SBAD signal maintains at the same level during a write power phase and a read power phase substantially. Then, the re-writable optical disk is recorded by using the optimum power. Next, a defect of the re-writable optical disk is detected according to the calibrated SBAD signal. Then, the optical disk drive will jump over the defect and prevent it from being data-recorded so as to avoid system malfunction.

20 Claims, 4 Drawing Sheets

OPTICAL DISK DRIVE FOR WRITING A RE-WRITABLE OPTICAL DISK AND METHOD THEREOF

This application claims the benefit of U.S. provisional application Ser. No. 60/520,711, filed Nov. 17, 2003, the subject matter of which is incorporated herein by reference.

BACKGROUND OF THE INVENTION

1. Field of the Invention

The invention relates in general to an optical disk drive and the method thereof, and more particularly to an optical disk drive capable of writing a re-writable optical disk and the method thereof.

2. Description of the Related Art

When an optical disk drive records an optical disk, such as a CDRW, the optical pick-up head emits laser of a write power during write power phase and of read power during read power phase. However, the optical disk drive performs an optimum power calibration (OPC) procedure to derive required optimum power before performing related disk-write operation.

The recorded data would be crashed if the optical disk try to record data on defect regions in a CDRW. Therefore the optical disk drive should detect those defect regions on the CDRW during disk-write operation so as to prevent those defect ones from being recorded during related disk-write operations.

Conventionally, a SBAD (sub-beam adder) is employed for detecting the defect regions on an optical disk. The so-called SBAD signal, which is the summation of the servo signals A, B, C, D, E, F, G and H, is also used to assist focusing of the optical pick-up head. The SBAD signal has different levels during write power phase and read power phase since there are different power being employed during these two phases.

FIG. 1 is a diagram showing WLDON signal and SBAD signal of a conventional optical disk drive. WLDON is used to indicate the laser power at the write power phase or at the read power phase. At the read power phase R, WLDON signal is at low level, while the WLDON signal is at high level during the write power phase W. Due to the difference of read power and write power, SBAD signal has corresponding levels of Sl and Sh.

FIG. 2 is a diagram showing SBAD signal when a defect of CDRW is found, wherein the SBAD signal level decays a defect threshold when it is affected by a defect region. Obviously, area D1 is a defect found during the read power phase, and is easily detected by using the SBAD signal level. However, area D2 is a defect found during the write power phase, which is not easily detected. If the defect threshold approximately equals to the level difference (Sh-Sl) of SBAD signal, the defect at area D2 during the write power phase would be recognized as a normal portion of the read power phase. If the servo system fails to recognize and jump away the defect area D2, the disk write operation may malfunction or result in an error.

SUMMARY OF THE INVENTION

It is therefore an object of the invention to provide an optical disk drive and the method thereof for correctly detecting defects of the optical disk during disk-write operations.

The invention achieves the above-identified object by providing a method of recording a re-writable optical disk for an optical disk drive having an optical pick-up head. The method includes the steps as follows. First, an optimum power is determined. Then, a gain of a SBAD (Sub Beam Adder) signal for generating an calibrated SBAD signal is adjusted such that the calibrated SBAD signal is maintained at the same levels at a write power phase and at a read power phase. Then, the re-writable optical disk is data-recorded by using the optimum power. Defects of the re-writable optical disk are detected according to the calibrated SBAD signal during the disk-write operation. Therefore, the servo system may jump over those defect regions on the CDRW and avoid them from being recorded when the defects are found.

The invention achieves another above-identified object by providing an optical disk drive capable of writing a re-writable optical disk, comprising an optical pick-up head, an adjustment apparatus and a controller. The optical pick-up head records the re-writable optical disk and outputting a SBAD signal. The adjustment apparatus adjusts the SBAD signal to output a calibrated SBAD signal and includes a measurement unit, a comparator and a calibration unit. The measurement unit measures a first level of the SBAD signal when the optical pick-up head operates at a write power phase and measuring a second level of the SBAD signal when the optical pick-up head operates at a read power phase. The comparator compares the first level with the second level and then generates a level difference. The calibration unit adjusts a gain of the SBAD signal by the level difference and generates a calibrated SBAD signal, wherein the calibrated SBAD signal maintains at the same levels at the write power phase and the read power phase. The controller detects the defect of the optical disk according to the calibrated SBAD signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
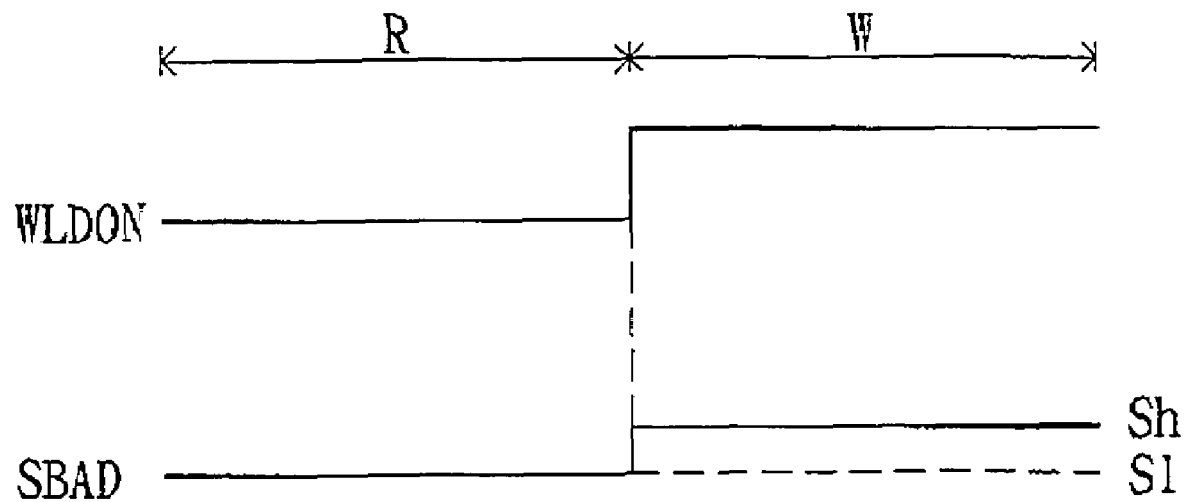
FIG. 1 (prior art) is a diagram showing WLDON signal and SBAD signal of a conventional optical disk drive.
Figure 2:
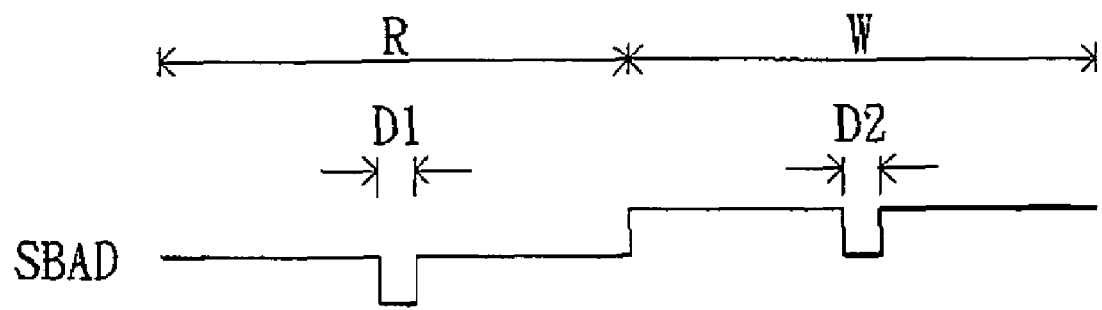
FIG. 2 (prior art) is a diagram showing an SBAD signal in response to a defected defect.
Figure 3:
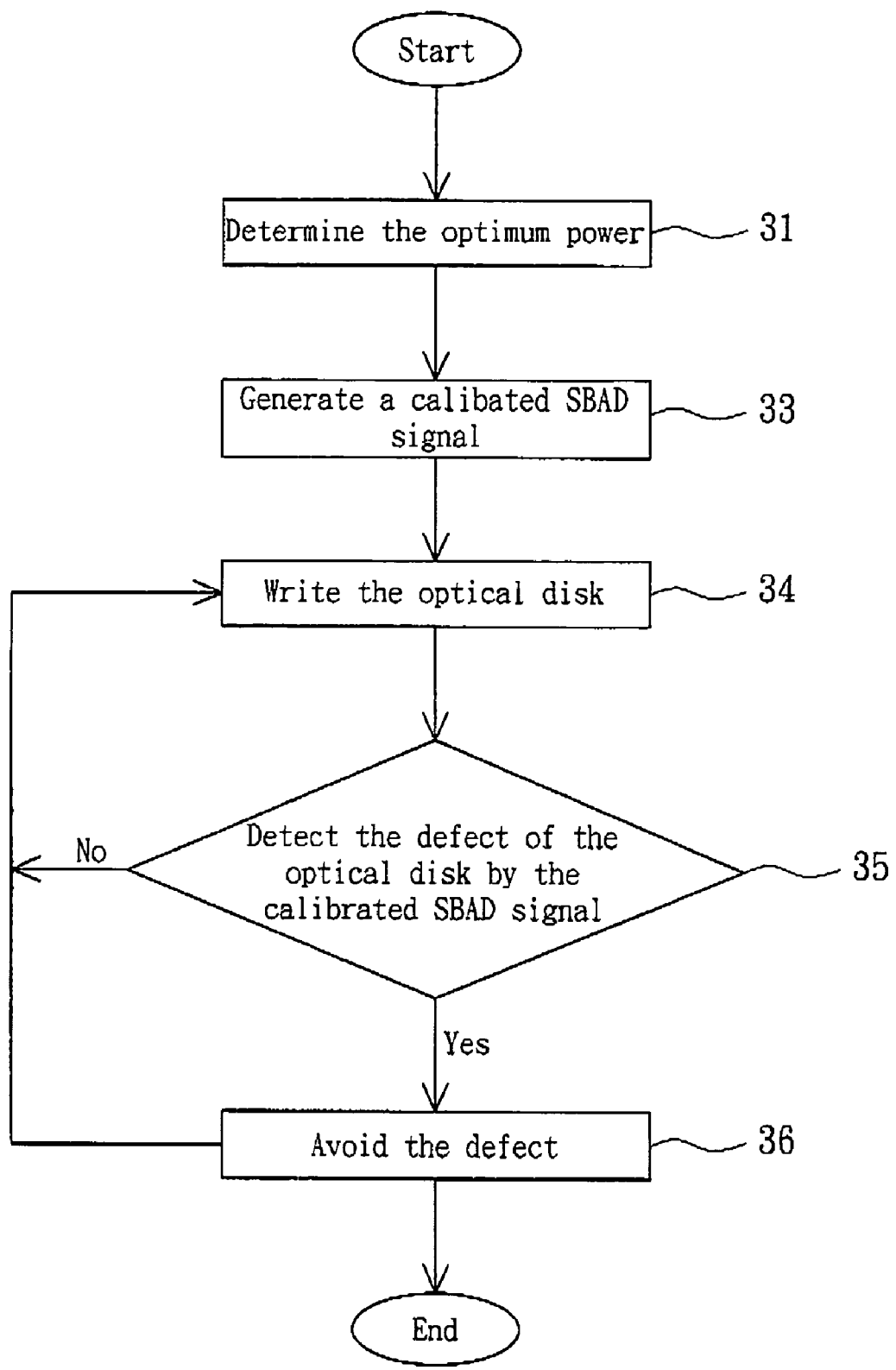
FIG. 3 is a flow chart of the method for writing a re-writable optical disk according to a preferred embodiment of the invention.

FIG. 3 is a flow chart of the method for writing a re-writable optical disk according to a preferred embodiment of the invention. The method begins at step 31 that performs an optimum power calibration (OPC) procedure at a non-data area of the optical disk, such as a power calibration area (PCA), to determine the optimum power during writing.

Next, at step 33, a calibrated SBAD signal, which has the same levels at the write power phase and at the read power phase, is generated. Next, at step 34, the optical disk is data-recorded by using the optimum power. During disk-write operation, defects of the optical disk are detected at step 35. A defect is found if calibrated SBAD signal decays to be less than a defect threshold. Meanwhile, the servo system force the optical disk drive to jump over the defect region and prevent the detected defect one from being data-recorded so as to ensure the data correctness at step 36.

Figure 4:
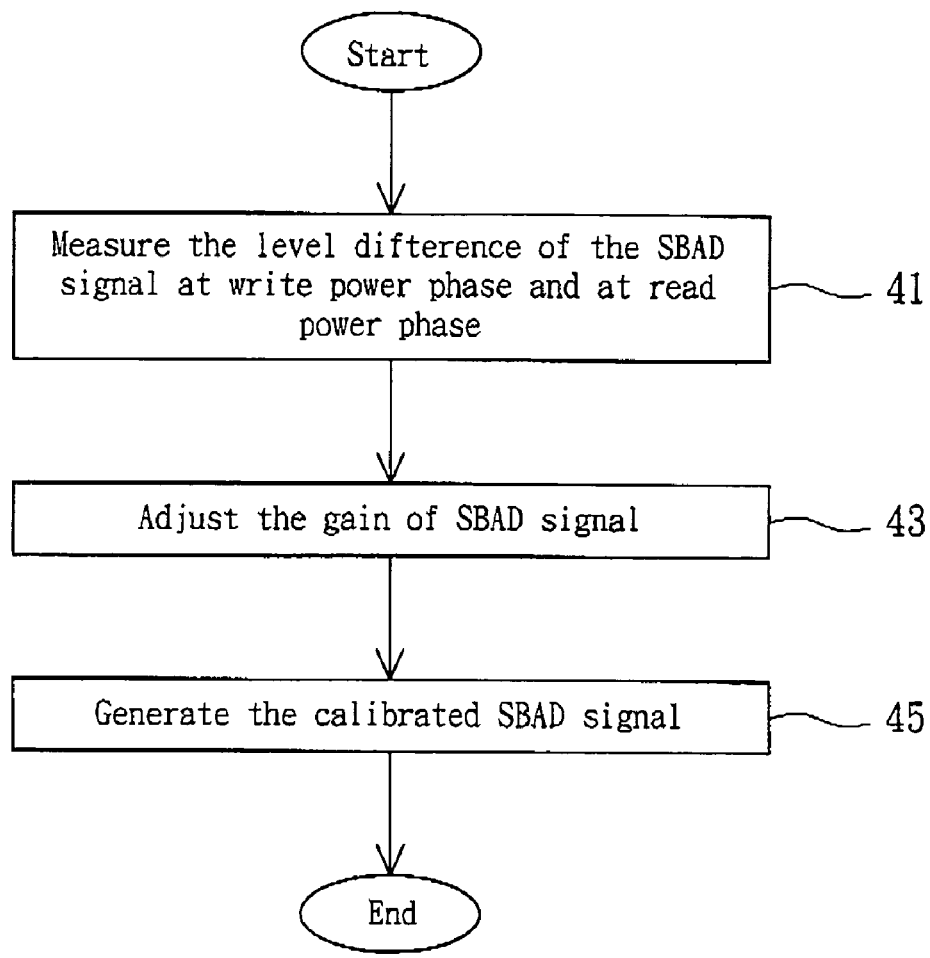
FIG. 4 is a flow chart of generating calibrated SBAD signal.

FIG. 4 is a flow chart illustrative of the procedure of generating calibrated SBAD signal at step 33. First, a recording test is performed at the power calibration area (PCA), such that the first level of the SBAD signal during the write power phase and measure the second level of the SBAD signal during the read power phase can be derived. Then, the first level is compared with the second level at step 41. Please note that the first level of SBAD signal can be derived while the optimum power is employed, and the second signal level can be derive when the just recorded region (by using the optimum power) is reading. Next, at step 43, the gain of SBAD signal is adjusted alternatively: decreasing the gain during the write power phase, or increasing the gain during the read power phase, such that the calibrated SBAD signal may maintains at the same levels during both of the write power phase and the read power phase. Then, the calibrated SBAD signal is delivered at step 45. It's not limited to write at the power calibration area while measuring the first and second levels of SBAD signal, any other non-data area can be used for deriving purpose as long as the normal data area of the optical disk will not be affected.

Figure 5:
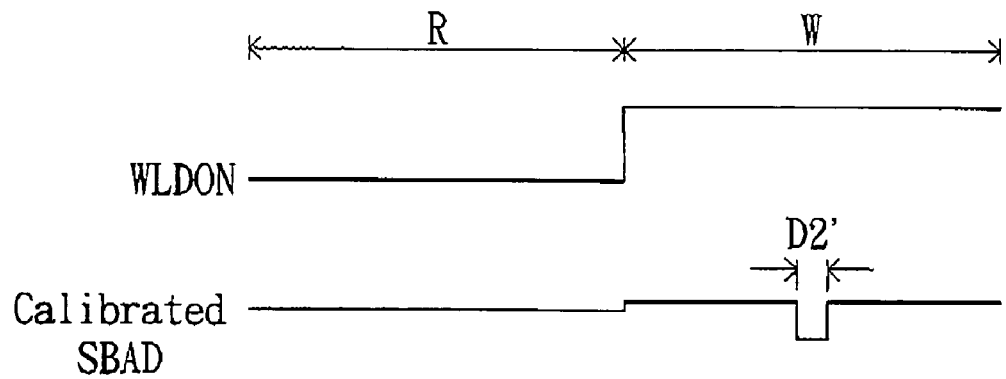
FIG. 5 is a diagram of WLDON signal and SBAD signal.

FIG. 5 is a diagram of WLDON signal and SBAD signal. During the read power phase R, WLDON signal is at low level, while WLDON signal is at high level during the write power phase W. The calibrated SBAD signal remains approximately constant if not a defect exist. On the other hand, if the servo system which employs the approach of decreasing the gain during write power phase detects the signal level of the calibrated SBAD signal will be less than that of the original SBAD signal as shown in D2' since the original SBAD signal is attenuated to derive the calibrated SBAD signal. Obviously, the disclosed method may accurately indicates where the defects of the loaded CDRW occurs such that the servo system may jump over these defect regions and prevent malfunctions during disk-write operation.

Figure 6:
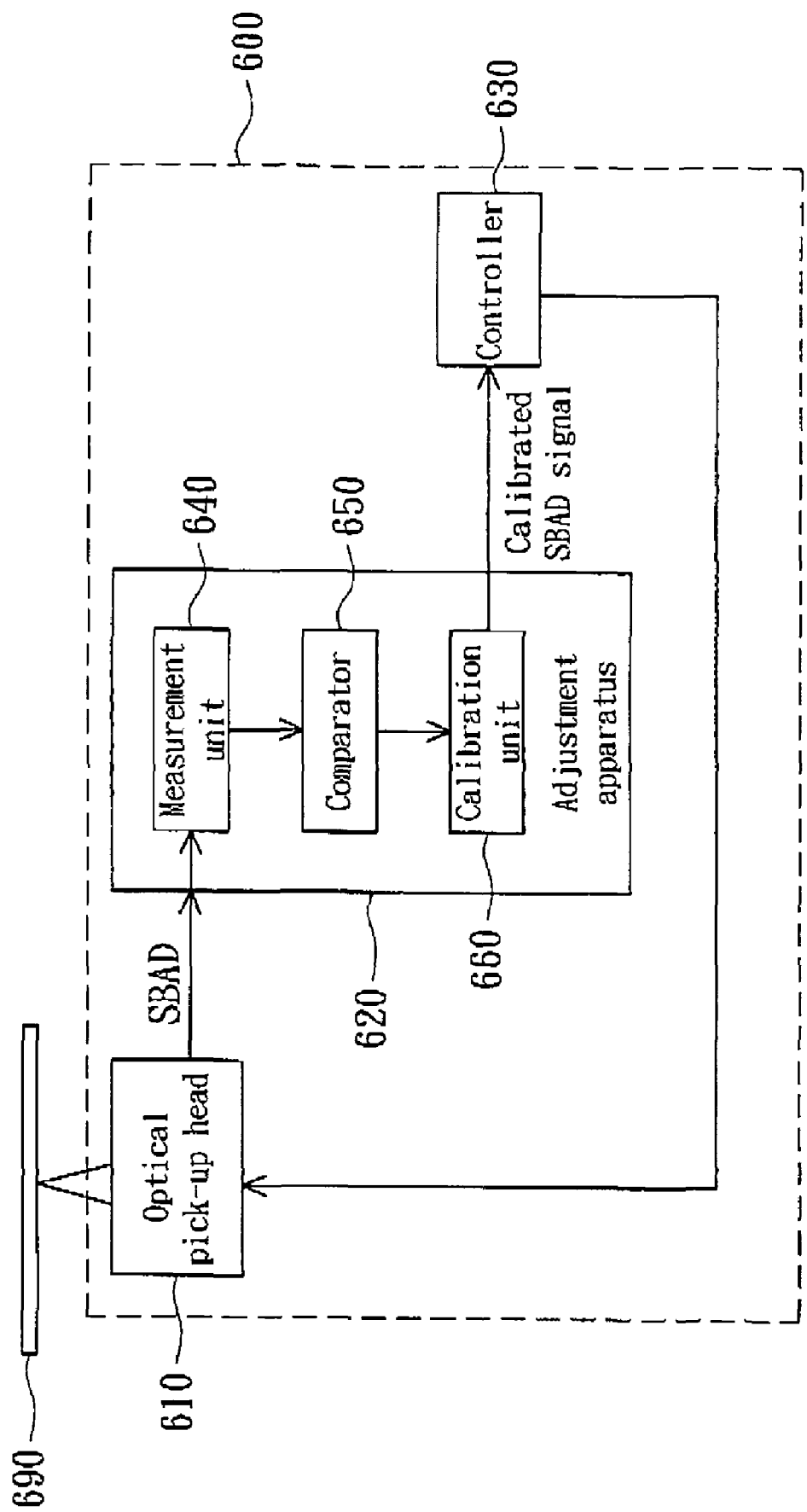
FIG. 6 is a block diagram of an optical disk drive according to a preferred embodiment of the invention.

FIG. 6 is a block diagram of an optical disk drive according to a preferred embodiment of the invention. The optical disk drive 600 includes an optical pick-up head 610, an adjustment apparatus 620 and a controller 630. The optical pick-up head 610 emits laser to write on the optical disk 690 and outputs SBAD signal. The adjustment apparatus 620 adjusts the gain of SBAD signal to output the calibrated SBAD signal. The controller 630 detects the defect of the optical disk 690 according to the calibrated SBAD signal.

The adjustment apparatus 520 includes a measurement unit 640, a comparator 650 and a calibration unit 660. The measurement unit 640 measures the first level of SBAD signal at the write power phase and measures the second level of SBAD signal at a read power phase. The comparator 650 compares the first level with the second level to generate a level difference. The calibration unit 660 adjusts the gain of SBAD signal by the level difference to generate the calibrated SBAD signal such that the calibrated SBAD signal has the same levels at the write power phase and the read power phase. Please note that the adjustment apparatus 620 may be integrated in the servo system chip of the optical disk drive for upgrading system instability during disk-write procedure. Additionally, the measurement unit 640, comparator 650 and calibration unit 660 may be established by means of combinational circuits or firmware (i.e. by using programs stored in memory and accessed for performing as requirements). Moreover, the controller 630 may be integrated with the adjustment apparatus 620 in an identical servo system chip such that the compensator (not shown) embedded in the servo system chip may manipulate the calibrated SBAD signal and then delivers related control signals to a driving circuit of the optical pickup head (not shown) so as to control the position of the optical pickup head. Any person having ordinary skills in the art may modify the embodiment as their requirements, but all similar modifications and variations within the spirits of the embodiment should be included within the appended claims.

The optical pick-up head 610 tests to write at the power calibration area (PCA) of the optical disk using the OPC procedure to determine the optimum power. Then, the optical pick-up head 610 writes at PCA using the optimum power. Meanwhile, the measurement unit 640 measures the first level of SBAD signal at the write power phase the second level of SBAD signal at the read power phase. The calibration unit 660 outputs the calibrated SBAD signal by decreasing the gain of SBAD signal at the write power phase, or increasing the gain of SBAD signal at the read power phase, such that the calibrated SBAD signal has the same levels at the write power phase and at the read power phase. It's not limited to write at the power calibration area while measuring the levels of SBAD signal, any other non-data area is ok as long as the normal data area of the optical disk is not affected.

During disk-write operation, the controller 660 finds the defect of the optical disk when the calibrated SBAD signal decays by the defect threshold so as to avoid writing to the defect.

The optical disk drive and the method thereof according to the preferred embodiment of the invention precisely detects the defects of the re-writable optical disk during writing so as to ensure the correctness of the written data.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of recording a re-writable optical disk for an optical disk drive having an optical pick-up head, the method comprising:

determining an optimum power;

adjusting a gain of a Sub Beam Adder (SBAD) signal for generating a calibrated SBAD signal such that the calibrated SBAD signal maintains at a same level during a write power phase and a read power phase substantially;

recording the re-writable optical disk using the optimum power;

detecting a defect of the re-writable optical disk according to the calibrated SBAD signal; and jumping over the detected defect and preventing the detected defect from being data-recorded.

2. The method according to claim 1 wherein the optimum-power determining step comprises:

performing an optimum power calibration (OPC) procedure at a power calibration area (PCA) of the re-writable optical disk to determine the optimum power.

3. The method according to claim 1 wherein the adjusting step comprises:
   testing to write at a non-data area of the re-writable optical disk by using the optimum power;
   measuring a first level of the SBAD signal while the optical pick-up head operates at the write power phase;
   measuring a second level of the SBAD signal while the optical pick-up head operates at the read power phase;
   generating a level difference by comparing the first level with the second level; and
   generating the calibrated SBAD signal according to the level difference such that the calibrated SBAD signal maintains at a same level at the write power phase and at the read power phase substantially.

4. The method according to claim 3 wherein the non-data area is a power calibration area.

5. The method according to claim 1 wherein in the adjusting step, the calibrated SBAD signal is generated by decreasing the gain of the SBAD signal at the write power phase such that the calibrated SBAD signal maintains at a same level during the write power phase and the read power phase substantially.

6. The method according to claim 1 wherein in the adjusting step, the calibrated SBAD signal is generated by increasing the gain of the SBAD signal at the read power phase such that the calibrated SBAD signal maintains at a same level during the write power phase and the read power phase substantially.

7. The method according to claim 1 wherein in the detecting step, the defect of the optical disk is determined when the calibrated SBAD signal decays at least a defect threshold.

8. A method for detecting a defect of a re-writable optical disk, comprising:
   measuring a first level of a Sub Beam Adder (SBAD) signal when an optical pick-up head operates at a write power phase;
   measuring a second level of the SBAD signal when the optical pick-up head operates at a read power phase;
   comparing the first level and the second level to generate a level difference;
   adjusting a gain of the SBAD signal by the level difference to generate a calibrated SBAD signal, wherein the calibrated SBAD signal maintains at a same level during the write power phase and the read power phase substantially; and
   detecting the defect of the optical disk by using the signal level of the calibrated SBAD signal.

9. The method according to claim 8 wherein the first level measuring step comprises:
   testing to write at a non-data area of the optical disk, wherein the non-data area is a power calibration area for instance; and
   obtaining the first level of the SBAD signal.

10. The method according to claim 9 wherein the second level measuring step comprises:
    testing to write at the non-data area of the optical disk; and
    obtaining the first level of the SBAD signal.

11. The method according to claim 8 wherein in the adjusting step, the calibrated SBAD signal is generated by decreasing the gain of the SBAD signal at the write power phase such that the calibrated SBAD signal maintains at a same level during the write power phase and the read power phase substantially.

12. The method according to claim 8 wherein in the adjusting step, the calibrated SBAD signal is generated by increasing the gain of the SBAD signal at the read power phase such that the calibrated SBAD signal maintains at a same level during the write power phase and the read power phase.

13. The method according to claim 8 wherein in the detecting step, the defect of the optical disk is determined when the calibrated SBAD signal decays at least a defect threshold.

14. An optical disk drive capable of writing an re-writable optical disk, comprising:
    an optical pick-up head for recording the re-writable optical disk and outputting a Sub Beam Adder (SBAD) signal;
    an adjustment apparatus for adjusting the SBAD signal to output a calibrated SBAD signal, the adjustment apparatus comprising:
       a measurement unit for measuring a first level of the SBAD signal when the optical pick-up head operates at a write power phase and measuring a second level of the SBAD signal when the optical pick-up head operates at a read power phase;
       a comparator for comparing the first level and the second level to derive a level difference; and
       a calibration unit for adjusting a gain of the SBAD signal by using the level difference to generate a calibrated SBAD signal, wherein the calibrated SBAD signal maintains at a same level during the write power phase and read power phase substantially; and
    a controller for detecting the defect of the optical disk according to the calibrated SBAD signal.

15. The drive according to claim 14 wherein the optical pick-up head performs an optimum power calibration (OPC) procedure at a power calibration area of the re-writable optical disk to determine an optimum power.

16. The drive according to claim 14 wherein the pick-up head tests to record at a non-data area of the re-writable optical disk by using the optimum power.

17. The drive according to claim 16 wherein the measurement unit measures the first level of the SBAD signal at a write power phase and measures the second level of the SBAD signal at a read power phase.

18. The drive according to claim 14 wherein the adjustment apparatus outputs the calibrated SBAD signal by decreasing the gain of the SBAD signal at the write power phase such that the calibrated SBAD signal maintains at a same level during the write power phase and the read power phase substantially.

19. The drive according to claim 14, wherein the adjustment apparatus outputs the calibrated SBAD signal by increasing the gain of the SBAD signal at the read power phase such that the calibrated SBAD signal maintains at a same level during the write power phase and the read power phase substantially.

20. The drive according to claim 14 wherein the controller finds the defect of the optical disk when the calibrated SBAD signal decays at least a defect threshold.

* * * * *